United States Patent [19]
Niesse

[11] 3,857,013
[45] Dec. 24, 1974

[54] METHODS OF AND APPARATUS FOR JOINING MATERIALS

[75] Inventor: Paul Joseph Niesse, Norcross, Ga.

[73] Assignee: Western Electric Company, Incorporated, New York, N.Y.

[22] Filed: June 25, 1973

[21] Appl. No.: 373,349

Related U.S. Application Data

[63] Continuation of Ser. No. 178,921, Sept. 9, 1971, abandoned.

[52] U.S. Cl.............. 219/85, 29/487, 29/501, 219/108, 219/117 R, 317/260
[51] Int. Cl.............................................. B23k 1/00
[58] Field of Search ............ 29/487, 501; 228/56; 219/85, 108, 117 R, 117 HD; 317/260

[56] References Cited
UNITED STATES PATENTS
1,248,813  12/1917  Costello .................... 219/108 X
2,455,136  11/1948  Obert ....................... 317/260 X

*Primary Examiner*—J. V. Truhe
*Assistant Examiner*—N. D. Herkamp
*Attorney, Agent, or Firm*—E. W. Somers

[57] ABSTRACT

Conductors are butt-brazed together by tensioning a disc of a brazing alloy material forming part of a control circuit and extending between the ends of the conductors to be brazed together. An operator starts the brazing cycle by depressing a push-button switch which controls the circuit to drive a motor-driven autotransformer to increase the current to heat and melt the brazing alloy and form a joint between the adjacent ends of the conductors. The melting of the end portions of the brazing disc extending between the ends of the conductors permits the remaining portion of the tensioned disc to become disengaged from the melted portion between the joint and control the circuit to drive the autotransformer in a reverse direction to decrease gradually the current and permit the joint to cool and anneal the brazing alloy material. Subsequently, a limit switch is opened to de-energize the circuit in preparation for another cycle of operation.

Provisions may be made to decrease the current through the joint substantially instantaneously, or gradually or instantaneously after the application of a maximum amount of current over a period of time.

15 Claims, 8 Drawing Figures

INVENTOR
P.J. NIESSE

BY E.W. Somers

ATTORNEY

LOAD AND CLAMP

OPEN AND POSITION ALLOY DISC

CLOSE AND READY FOR BRAZING

METHODS OF AND APPARATUS FOR JOINING MATERIALS

This a continuation of application Ser. No. 178,921 filed Sept. 9, 1971 now abandoned.

BACKGROUND OF THE INVENTION

1. Field of the Invention

The present invention relates to methods of and apparatus for joining materials, and more specifically to methods of and apparatus for automatically brazing together the end portions of conductors that compensate automatically for such variables as conductor gauge, variations in line voltage, contact resistance and at least the required amount of brazing material to form a joint.

2. Technical Considerations and Discussion of the Prior Art

Three presently used methods of splicing or joining exchange cable conductors are resistance welding, resistance brazing and cold welding. Resistance welding includes the steps of squaring off the conductor ends, butting the ends of the conductors under pressure, and applying sufficient current through the junction between the conductor ends to soften, say, the copper, and cause a fused weld. Resistance welding of small wires in the range of 19–26 gauge is rapidly becoming obsolete due to the difficulty in removing flash, to the use of tandem wire drawing with conductor insulating, to the relatively high degree of skill which is required, and to what apparently is a poorer quality splice than may be achieved with other joining methods.

A second method of joining conductors, cold welding, is a relatively recent method of splicing and involves successive short stroke high pressure fusion of butted conductor ends at either room or relatively cold temperatures. The butted area within the junction between the ends of the conductors is literally extruded outwardly with flash, leaving a cold-worked joint that is usually of a higher tensile strenth than the adjacent material. Some believe that, to date, in many manufacturing operations, there has been limited and questionable success with the cold welding of small gauge wires. It is also believed that there have been some maintenance problems involved with this process and in many instances users have converted to a resistance brazing process.

Successful cold welding techniques have several advantages over other techniques used to join conductor ends in that wire-end preparation and wire alignment by an operator, and an external power supply are not required. Also, cold welding may be used on both copper and aluminum conductors.

The method of resistance brazing, unlike cold welding, involves the squaring off as well as the butting of the conductor ends, followed by the steps of heating the joint while adding a small amount of a brazing alloy. This technique has been moderately successful in operations where it is desirable to join conductor ends.

The advantages of resistance brazing include a generally reliable joint with little or no flash. On the other hand, a relatively high degree of operator skill and judgement are required. Also, although resistance brazing is a usuable technique for joining the ends of copper conductors, there is some doubt as to the use thereof in joining aluminum conductors. In that regard, the selection of an acceptable brazing alloy and corrosion between dissimilar materials are problems that may be difficult to solve.

In order to obtain an adequately brazed joint, it is necessary to clean, square off, and align the ends of the conductors to be joined. Moreover, the amount of current or the degree of heat must be coupled with the correct length of heating time to permit the brazing alloy to melt and flow fully in and around the joint. An additional factor is that with any particular set of conditions, there is a range of current and/or time which can be utilized. The amount of brazing alloy which is to be used is also relevant, but less critical since there is a wide range as to the amount that may be applied to yield an acceptable joint.

Presently, there are two brazing apparatus and two brazing techniques which are used in manufacturing process. One apparatus and technique employs variable current control with two fixed clamping fingers which hold the wire ends. In using this apparatus, an operator bends and trims the wire ends and then abuts the wire ends to form a butted joint. Then the operator energizes a circuit to apply a current, adds brazing alloy, which is in the form of a ribbon or wire, and subsequently de-energizes the circuit to discontinue the application of current to the joint.

The above-described brazing apparatus has the advantage of being small in size; however, there is the disadvantage of a high degree of operator skill and judgement being required. Also there is little control over differences in individual wire lengths of a brazed pair after twisting which may result in high tensile stresses and breakage of the shorter wire in the brazed pair during stranding.

In another apparatus, which is commercially available, a multi-tapped transformer primary is used for different currents together with a fairly complex brazing head with extendable and pretensioned jaws to facilitate the alignment of the butted wire ends and also to permit adjustments in pressure. This apparatus, which must be accurately manufactured in order to meet a critical alignment necessary for resistance welding, also performs adquately for resistance brazing. Alignment is easier and brazed joints may be made without any gain or loss of the conductor material, thereby permitting pair splicing with equal length conductors to overcome the problems heretofore described. The pretensioned jaws also permit a second brazing technique to be used which involves sandwiching a ribbon of brazing alloy material between the pretensioned butted wire ends, applying current, removing the ribbon after an end portion thereof has melted, and then discontinuing the application of current. In this regard, the ribbon may be pretensioned so that after the end portion thereof has melted, there is an automatic release of the unmelted portion of the ribbon from the joint.

Another brazing machine which has been developed for experimental purposes contains an infinitely variable autotransformer for voltage control and an adjustable timer for fixing a timing cycle. Also, this apparatus includes automatic releasing of a spring-loaded brazing alloy after the alloy is sandwiched between the wires to be brazed. Switches for either manual or automatic timed cycling are also provided. There have been thoughts that a nearly automated technique could be achieved by utilizing a fixed voltage and time that would involve only an initial set-up by the operator and a start cycle. However, it was found that although one voltage setting could be used for 22, 24 and 26 gauge wires, a higher setting was required for 19 gauge wires. Also, difficulties were encountered in hlding a given set of conditions from one day or time to the next which resulted in non-uniformity between brazed joints even though the voltage and time values were set and known. It is believed that factors such as varying wire and component contact resistances contributed to the non-uniformity between the brazed joints.

Another technique may involve not using a timer, but rather fixing the voltage and manually effecting a brazed joint by terminating the cycle immediately upon visually detecting the release of the spring-loaded brazing alloy sandwiched between the ends of the conductors. However, even with this technique, it has been found that two voltage settings were necessary. The previously mentioned difficulty of holding constant conditions was also evident although to a lesser degree because the weld time was manually controlled to account, within limits, to the conditions.

Prior art apparatus for joining metal parts is typified by that shown in U.S. Pat. No. 1,248,812. In that patent, there is provided a pair of clamps for holding the parts to be united and arranged in a circuit with a step-down transformer, the primary coil of which is in series with a power supply and the contact of a relay. The secondary coil of the transformer is connected to the clamps and a fusing material is positioned between the ends of the parts to be joined. In operation, a relay circuit is completed to energize the relay to close the contact thereof and complete a circuit through the primary coil. A low voltage current flows through the secondary coil, the clamps and the parts to be united to raise the temperature of the parts and melt the fusing material. The melting of the fusing material throws the fusing material out of engagement with the clamps to break the relay circuit and the voltage through the primary circuit thereby allowing the parts to cool and the fusing material to solidify in the joint therebetween.

This apparatus uses a fixed step-down transformer for supplying a predetermined low voltage current to splice together parts of a particular size and shape. Even if a tapped or adjustable transformer were used as a substitute for that shown, an operator must adjust the voltage or current for different size parts which are to be spliced. Also, the apparatus shown in that patent does not have facilities for compensating for significant variations in line voltage or contact resistance as between the parts. Such variations could result in insufficient heat to melt the fusing material or too much heat which could cause a burnout at the splice joint.

It is therefore an object of this invention to provide methods of and apparatus for joining a first part to a second part. It is a further object of this invention to provide methods of and apparatus for joining an end portion of a first conductor to an end portion of a second conductor automatically independently of conductor size, line voltage and/or contact resistance.

The prior art also includes patents, such as U.S. Pat. No. 2,267,606, having facilities for gradually increasing the voltage in an output circuit. Facilities such as these might be included in apparatus for joining parts in raising the current through the joint between the parts to that required to melt a brasing alloy meterial interposed between the parts. In the above-identified patent, a motor-driven variable transformer is used for the filament supply of a radio transmitter. Upon the application of power to the system, a motor is started and slowly moves a sliding brush around the periphery of a toroidally-wound autotransformer to gradually increase the power supply to the filaments. When a predetermined value of voltage is reached, the motor power is disconnected and the transformer contact maintained in a fixed position.

Facilities such as this, however, would require the preselection of a value of current required to melt the brazing alloy material which is and of course would depend on such variables as conductor gauge, and indeterminable changes in line voltage and contact resistance. The operation of a semi-sutomatic brazing apparatus would be greatly facilitated if a circuit could be provided with facilities for automatically providing a gradual increase in current to that required to melt a brazing alloy sandwiched between the ends of the conductors to be joined.

SUMMARY OF THE INVENTION

It is an object of the invention to provide methods of and apparatus for joining a first part to a second part.

It is another object of this invention to provide methods of and apparatus for brazing together a pair of conductors with provisions for automatically applying adequate current to melt a brazing alloy interposed between the conductors and for then decreasing the current through the joint.

A method of joining a first part to a second part embodying certain principles of this invention includes the steps of holding the first and second parts with a fusible material interposed therebetween and in engagement with each of the parts, applying energy to the fusible material, controlling the application of the energy to the fusible material to melt the fusing material and to decrease the energy applied to the fusing material to solidify the fusible material and to form a joint between the parts. The decrease in application of energy to the fusible material may be controlled to be accomplished (1) gradually, (2) substantially instantaneously, or (3) gradually or instantaneously after a period of time during which the application of energy is held at a maximum value.

An apparatus for joining a first part to a second part embodying certain principles of this invention includes facilities for holding the first and second parts with a fusible material interposed therebetween and in engagement with each of the parts, facilities for applying energy to the fusible material, and facilities for controlling the application of energy to the fusible material to melt the fusible material in engagement with the parts and decrease the energy applied to the fusible material to solidify the fusible material and form a joint between the parts. Facilities may be provided to decrease the application of energy to the fusible material (1) graudally, (2) substantailly instantaneously, or (3) gradually or substantially instantaneously after a period of time during which the application of energy is held at a maximum value.

DETAILED DESCRIPTION OF THE INVENTION

Figure 2:
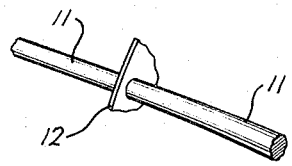
FIG. 2 is an enlarged detail perspective view of a pair of conductors in engagement with a portion of a disc of brazing alloy material.
Figure 1:
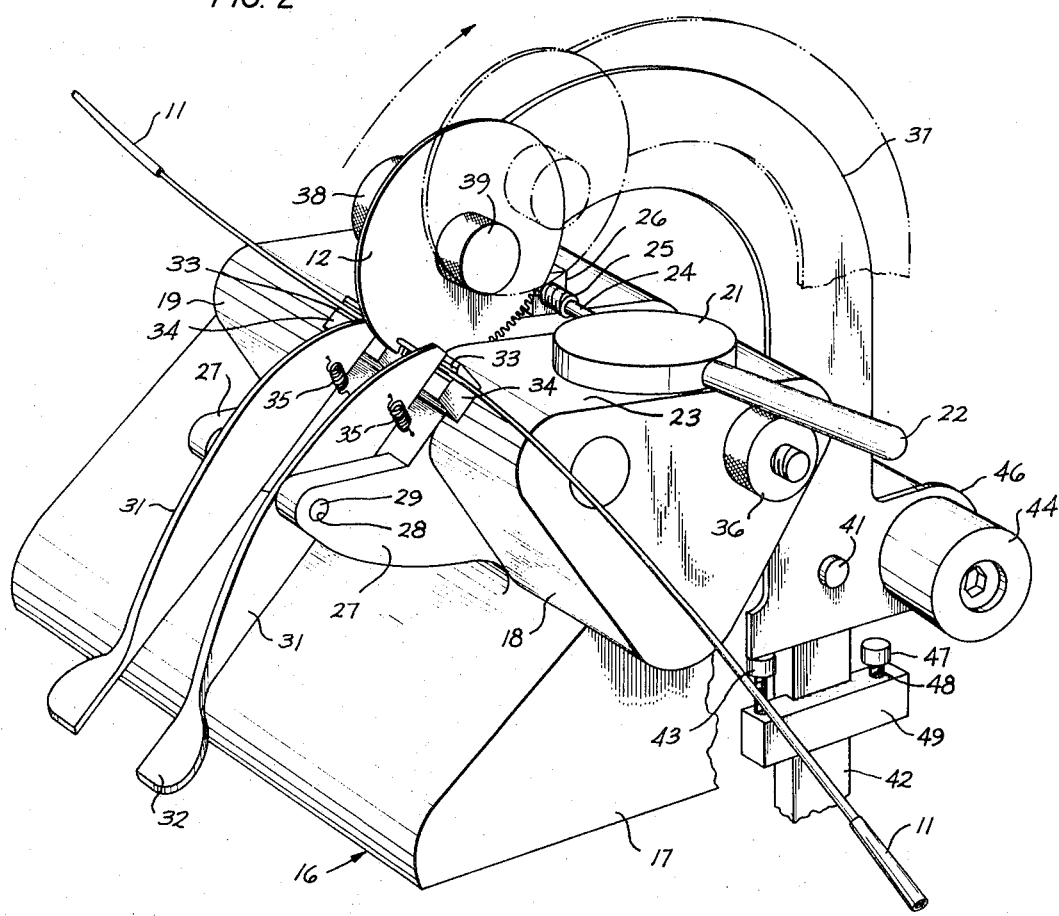
FIG. 1 is a perspective view of an apparatus which may be used to carry out the principles of the invention to join together end portions of a pair of conductors.

An apparatus, designated generally by the numeral 10, for carrying out the principles of the invention is shown in FIG. 1 and includes facilities for aligning and holding end portions of two conductors 11—11 in abutting frictional relationship with a portion of a brazing alloy material, in the form of a disc 12, sandwiched therebetween. The disc 12 forms part of an electrical control system, designated generally by the numeral 13 (see FIG. 3), for controlling the application of electrical current to the conductors 11—11 and the disc to melt the portion of the disc to form a brazed joint. The electrical control system 13 includes facilities for automatically supplying the current required to melt the portion of the disc 12 as between successive pairs of conductors 11—11 independent of such factors as conductor gauge, variations in line voltage, and variation in contact resistance as between the successive pairs of conductors.

Referring now to FIG. 1, the apparatus 10 is shown to include a workholder, designated generally by the numeral 16, for holding two conductors 11—11, the end portions of which are to be joined together. The workholder 16 includes a base 17 having a pedestal 18 fixedly attached to the right-hand side thereof, as viewed in FIG. 1. Also, the workholder 16 includes a pedestal 19 which is mounted in bearings (not shown) for reciprocal movement on the base 17 and which is spaced from the fixed pedestal 18.

Facilities are provided for causing relative movement between the stationary pedestal 18 and the fixed pedestal 19. A cam 21 (see FIG. 1) having a lever 22 extending laterally therefrom is mounted rotatably on a top surface 23 of the fixed pedestal 18. The contoured surface of the cam 21 is engaged by an insulated follower 24 which is held in and extends from a threaded rod 25 that spans from the cam across to the movable pedestal 19. The threaded rod 25 is received threadably in a supporting block 26 that is connected to the movable pedestal 19, so that the rod may be turned threadably into or out of the block to adjust the span between the pedestals. A rotational movement of the cam 21 in a first direction causes the follower 24 to ride along the contoured surface of the cam to move the pedestal 19 farther from the fixed pedestal 18. It is to be noted that the pedestals 18 and 19 are suitably insulated from each other to prevent a "shorting out."

Provisions are made on the pedestals 18 and 19 for supporting and holding the conductors 11—11, the end portions, of which are to be butt-brazed together. Each of the pedestals 18 and 19 has a cantilevered member 27 extending laterally therefrom. Each of the cantilevered members 27—27 has an opening 28 formed therein for receiving a pin 29. The pins 29—29 support individual pivotally-mounted clamping bars 31—31 having hand-engaging portions 32—32. Each of the clamping bars 31—31 is designed to clamp an end portion of an associated conductor 11 in engagement with the walls of a groove 33 formed in an associated support block 34. In order to hold the conductors 11—11 in engagement with the support blocks 34—34, the clamping bars 31—31 are biased in a clockwise direction, as viewed in FIG. 1, by springs 35—35.

Facilities are also provided for returning the movable pedestal 19 into closer proximity with the fixed pedestal 18 after the cam 21 has been turned rotatably in a second direction, opposite to the first direction. A tension spring (not shown) extends between the pedestals 18 and 19 with each end thereof attached to threaded rods (not shown) received in a bore formed through the pedestals. One of the rods (not shown) is connected to a knurled knob 36 (see FIG. 1) that may be turned to adjust the tension force between the pedestals 18 and 19.

The joint between the end portions of the conductors 11—11 is formed by inserting a portion of the disc 12 of brazing material therebetween and melting that portion of the disc. The disc 12 is held to position successive portions thereof between the successive pairs of conductors 11—11 to be spliced by supporting rotatably the disc from a supporting bracket 37. An indexing knob 38 on one side of the bracket 37 has a threaded pin (not shown) which projects through an opening in the bracket and an aligned opening in the disc and is received in a theaded opening of a retaining nut 39. This arrangement permits an operator to cyclically turn the knurled index knob 38 to permit rotation of the disc 12 to position an unused portion thereof between a next successive pair of conductors 11—11 to be joined together.

The indexing knob 38 is connected to the supporting bracket 37 in such a manner as to control the circumferential positioning of the disc 12 with respect to the conductors 11—11. This is accomplished by providing a ratchet and pawl arrangeent (not shown) to permit an operator to incrementally turn the disc 12 through a predetermined angle of rotation. Since the successive indexing and using of the disc 12 for brazing forms a generally serrated circumferential edge (see FIG. 1), this arrangement ensures that the indexing of the disc positions an unused portion thereof in alignment with the conductors 11—11.

The supporting bracket 37 is mounted for pivotal movement about a pivot pin 41 extending laterally from one surface of a stub column 42. When a portion of the disc 12 is clamped between juxatposed end portions of the conductors 11—11, the supporting bracket 37 is held as viewed in FIG. 1 in engagement with a first stop 43 by the frictional engagement between the conductors and the radial surfaces of the disc. In the event that the remainder of the disc 12 were to be separated from the portion of the disc held between the conductors 11—11, the supporting bracket 37 is urged in a clockwise direction, as viewed in FIG. 1, by a counterweight 44 attached to an extension 46 of the bracket opposite the pivot pin 41. The extent of the movement in the counterclockwsie direction may be controlled by turning theadably a second stop 47 into or out of an opening 48 in an abutment 49 connected to the stub column 42. It should be noted that the counterweight 44 is selected so that the counterweight cannot overcome the frictional forces between the disc 12 and conductors 11—11. This prevents the removal of the disc 12 from engagement with the conductors 11—11 prior to application of an electrical current.

The position of the stop 43 in relation to the mounting of the supporting bracket 37 facilitates the automatic positioning of the disc 12 between the conductors 11—11 to provide an optimum amount of brazing material in the joint. If the conductors 11—11 engaged the disc 12 at a portion of the radial surfaces thereof which were too far interior of the peripheral edge, a higher than necessary amount of energy may be applied due to the longer time required for a greater portion of the disc to melt and become disengaged from the wire. Also, more alloy than necessary may be applied and difficulties could be experienced in the relative movement between the conductors 11—11 and the disc 12 over excessively long distances.

Facilities may also be provided for connecting the support bracket 37 and the ratchet and pawl (not shown) attached to the indexing knob 38 so that when the supporting bracket is pivoted in a counterclockwise direction, as viewed in FIG. 1, to position the disc 12 between the conductors 11—11, the disc is automatically indexed. Of course, the indexing of the disc 12 could be accomplished as the supporting bracket 37 is moved in a clockwise direction at the conclusion of each brazing cycle.

The melting of the successive portions of the disc 12 positioned and held between juxtoposed end portions of successive pairs of the conductors 11—11 is accomplished by connecting the disc and the conductors into the electrical control system 13. The electrical control system 13 is connected across input terminals 51 and 52 with a line running from the terminal 51 through an on-off switch 53, through a push-button switch 54, along a line 56 and into one side of a primary coil 57 of a transformer 58. The other side of the primary coil 57 is connected through a junction point 59 along a line 61 through junction points 62 and 63 back to the terminal 52. The transformer 57 is used to prevent operator shocks; otherwise, the voltage between lines 56 and 61 could be connected directly to line 69.

Figure 3:
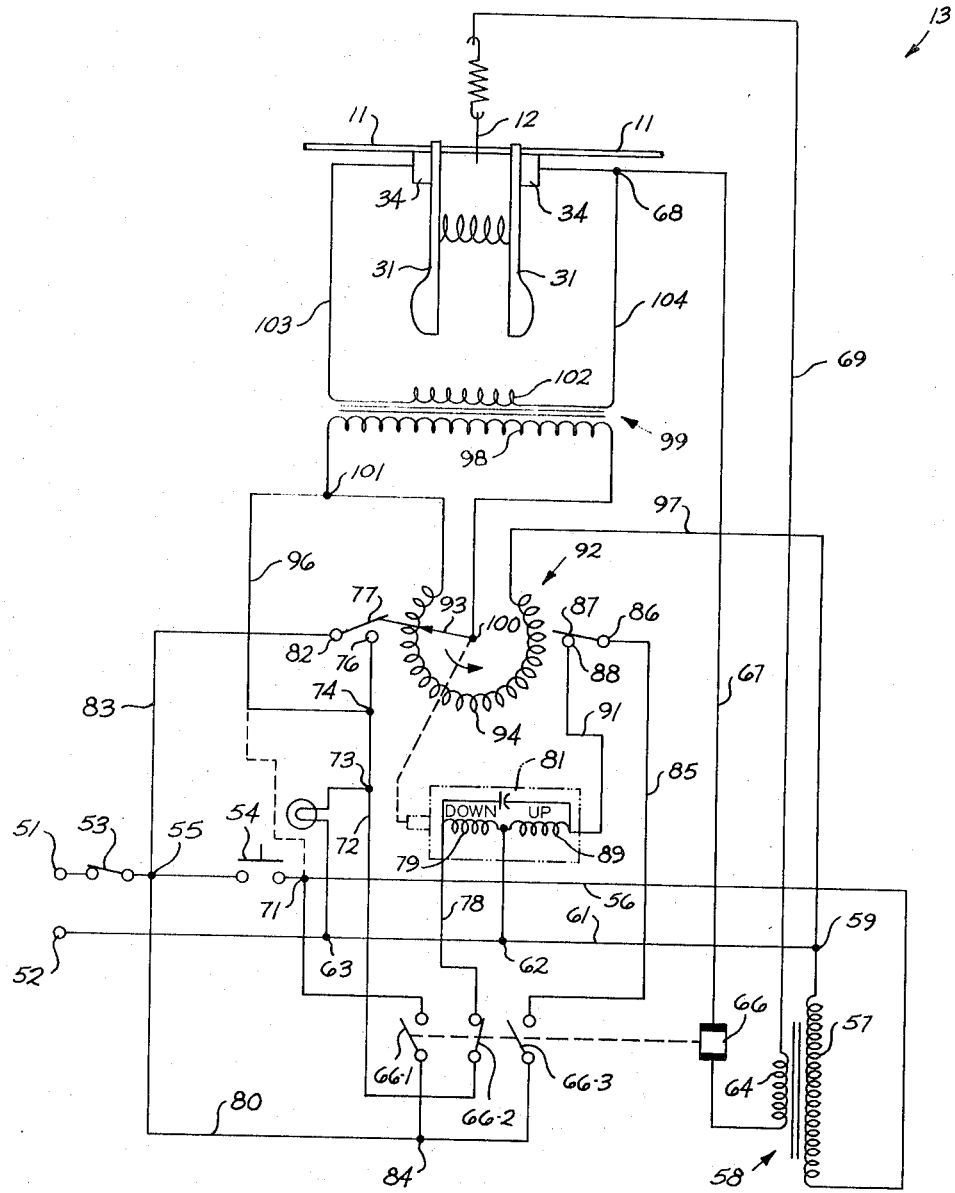
FIG. 3 is a schematic view of an electrical control system which is used to control the operation of the apparatus shown in FIG. 1.

The transformer 58 also includes a secondary coil 64 which is connected through a relay 66 along a line 67 through a junction point 68 to the right-hand one of the support blocks 34—34, as viewed in FIG. 3. The other side of the secondary coil 64 is connected along a line 69 to the support bracket 37, which is, of course, connected electrically to the disc 12 and the joint between the abutted ends of the conductors 11—11. It is to be noted that the counterweighted support bracket 37 is represented schematically in FIGS. 3, 5 and 6 as a spring to indicate a biasing force applied to the disc 12 of brazing alloy material, A spring can be used; but as shown, it does not permit the use of automatic depth insertion of the brazing alloy material as with the support bracket 37 shown in FIG. 1.

The relay 66 has contacts 66—1, 66—2, and 66—3 with the contact 66—1 being normally open and connected to a junction point 71 in the line 56 between the pushbutton switch 54 and the primary coil 57 of the transformer 58. The contact 66—2 is normally closed to complete a circuit along line 72 through junction points 73 and 74 to one terminal 76 of a normally closed low-limit switch 77, now held open, and along a line 78 to one side of a "down" coil 79 of a bidirectional motor 81. A second terminal 82 of the limit switch 77 is connected along a line 83 through the junction point 55 and along a line 80 to a junction point 84 to one side of the contact 66—3, normally open, and then along a line 85 to one terminal 86 of a high-limit switch 87. The other terminal 88 of the limit switch 87 is connected to one side of an "up" coil 89 of the motor 81 along a line 91. A terminal 90 in the motor 81 and common to both the "down" coil 79 and the "up" coil 89 is connected to the junction point 62.

The motor 81 is connected to a motor-operated autotransformer, designated generally by the numeral 92. The shaft (not shown) of the motor 81 is connected through a gear system (not shown) to the autotransformer 92 and connected thereto by a set screw (not shown). The gear system (not shown) can be changed to shorten or lengthen the cycle time during which the motor 81 drives the autotransformer 92. Lengthening of the cycle turn would tend to prevent "overshoot" before the motor 81 is reversed. The autotransformer 92, a commercially available speed control, is a transformer, the output voltage of which is varied by turning an arm 93. An autotransformer differs from a regular transformer in that the autotransformer has only one winding 94 instead of a primary coil and a secondary coil. The change in voltage is obtained by connecting the one winding 94 across an impressed voltage and tapping off another circuit with more or fewer turns.

This is accomplished by connecting the winding 94 of the autotransforemr 92 along a line 96 to the junction point 74, and along a line 97 to the junction 59. Then, the arm 93, which is mounted for rotary movement and driven clockwise or counterclockwise by the motor 81, is designed to first disengage from and close the low-limit switch 77, and if turned through a large enough angle to engage and open the normally closed high-limit switch 87. The high-limit switch 87 is used for safety purposes, and, if opened, interrupts the circuit through the motor 81 to discontinue the operation of the motor. The position of the low-limit switch 77 and the high-light switch 87 with respect to the path of travel of the arm 93 of the autotransformer may, of course, be adjusted.

The autotransformer 92 is integrated with the control system 13 to supply current to the conductors 11—11 and the section of the brazing alloy material held therebetween to melt the section of alloy material and form a joint. In order to accomplish this, the arm 93 is connected electrically to one side of a primary coil 98 of a brazing transformer 99. The other side of the primary coil 98 is connected to the line 96 at a junction point 101. The brazing transformer 99 also includes a secondary coil 102 which is connected along lines 103 and 104 to the support blocks 34—34.

OPERATION

In carrying out the principles of the methods of this invention to braze together the end portions of a pair of conductors 11—11, the operator strips the insulation from an end portion of each of the conductors and then squares off the ends. It is to be understood that the methods and apparatus of this invention could be used to join together bare wires as well as the insulated conductors 11—11.

Figure 4A:
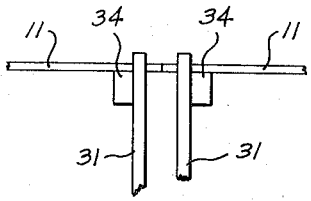
FIGS. 4A, 4B and 4C are a series of detailed plan views of the steps involved in setting up the conductors and the disc of brazing alloy material in preparation for the formation of the joint therebetween.

Subsequently, the operator depresses one of the clamping bars 31—31 and positions one of the conductors 11—11 in engagement with the associated one of the support blocks 34—34 so that the wire end is approximately midway between the support blocks. The operator then releases the clamping bar 31 to permit the associated spring 35 to move the associated clamping bar 31 to engage the conductor 11 and clamp the conductor in engagement with the walls of the groove 33 of the support block 34. The operator repeats this procedure with the other conductor 11 in such a manner that the end of the conductor is aligned with and engages the end of the other conductor (see FIG. 4A).

Then the operator grasps the lever 22 and turns the cam 21 to urge the follower 24 and the pedestal 19 to the left, as viewed in FIG. 1, away from the pedestal 18. This causes the end of the one conductor 11 held on the pedestal 19 to become spaced from the end of the other conductor held on the fixed pedestal 18 (see position 2 shown in FIG. 4B).

Figure 4B:
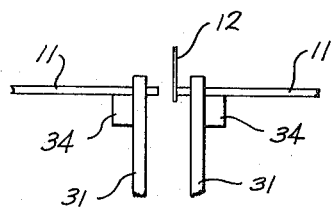

Next, the operator with one hand moves the pivotally mounted supporting bracket 37 in a counterclockwise direction, as viewed in FIG. 1, from a rest position in engagement with the stop 47 until the bracket engages the stop 43 at which time a portion of the disc 12 is positioned between the aligned, now spaced, conductor ends (see FIG. 4B).

Figure 4C:
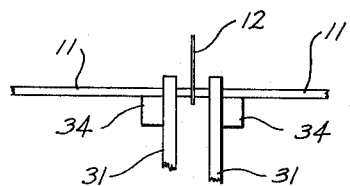

While holding the supporting bracket 37 in engagement with the stop 43, the operator again grasps the lever 22 and turns the lever and cam 21 in the second direction, opposite to the first direction. The spring-biased carriage pedestal 19 is urged to move toward the fixed pedestal 18 and moves the end of the conductor 11 held on the carriage pedestal into engagement with the disc 12 and to impart an axial force to the disc and other conductor (see FIG. 4C). It is to be noted that the support bracket 37 may be urged laterally through small distances so that the disc 12 may be positioned properly between the wire ends even though the wire ends may not have been initially butted exactly midway between the supports 34-34.

In this way, when the operator ceases to hold the supporting bracket 37, the disc 12, being clamped in frictional engagement between the conductor ends, overcomes the counterweight 44 and prevents the supporting bracket 37 from moving pivotally in a clockwise direction, as viewed in FIG. 1.

The engagement of the conductor ends with the disc 12 conditions partially a circuit along the line 69 through the secondary coil 64 of the transformer 58, through the relay 66, normally de-energized, then along the line 67 through the right-hand support block 34, as viewed in FIG. 3, and through the associated conductor 11.

At the beginning of a series of brazing operations, the operator initially closes the switch 53. Then the operator depresses the push button switch 54 to complete a circuit from the terminal 51 along the line 56 to the primary coil 57 of the transformer 58 and back along the line 61 to the terminal 52. This induces a current in the secondary coil 64 of the transformer 58 which now completes the heretofore partially conditioned circuit along the line 69, the support bracket 37, the disk 12, and through one of the conductors 11—11, the support block 34 and back along the line 67 through the relay 66 to energize the relay.

The energization of the relay 66 closes the normally open contact 66—1 which completes a circuit from junction point 55 along the line 80 to the junction point 84 and junction point 71 which holds in the relay after the operator releases the pushbutton switch 54.

Figure 5:
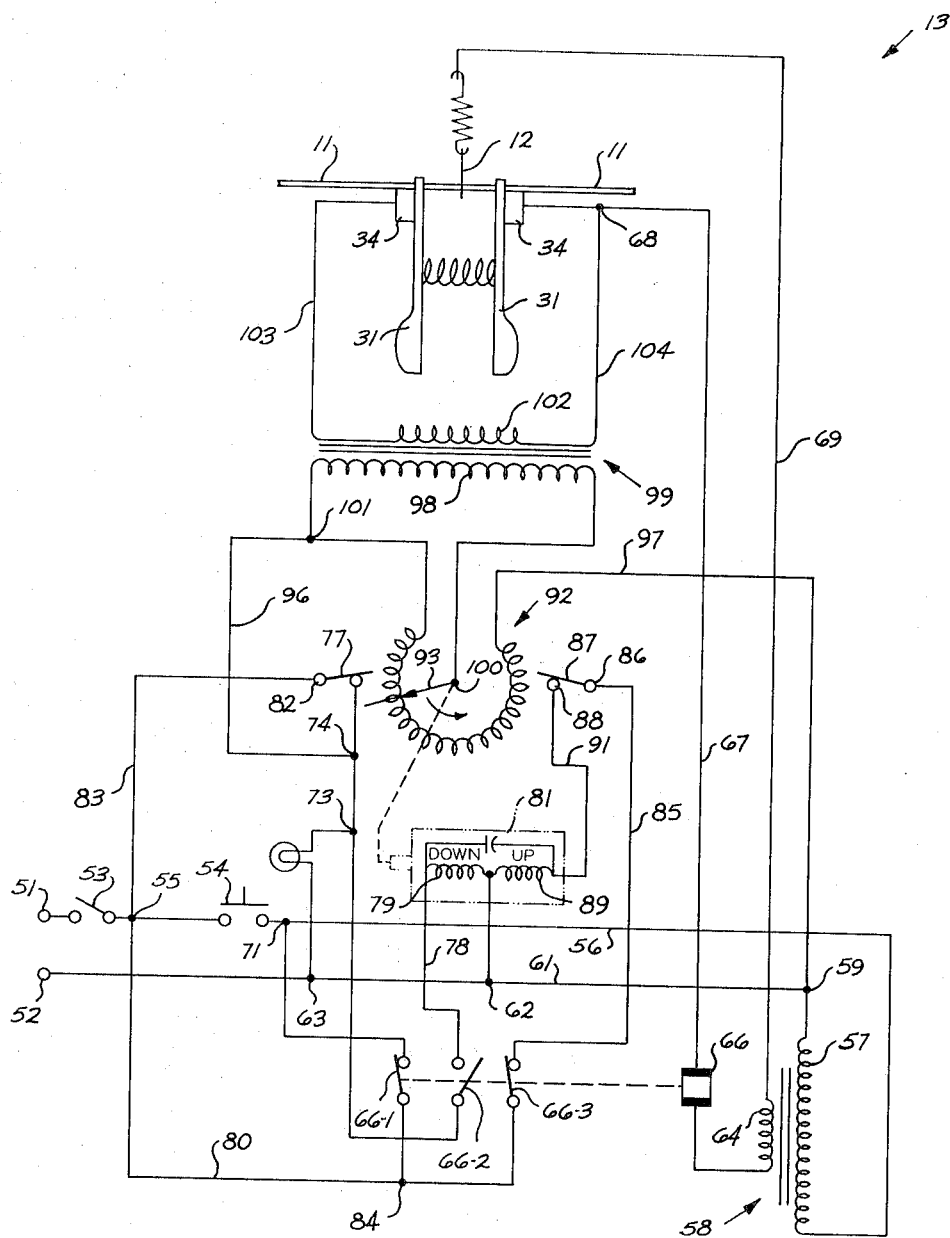
FIG. 5 is a schematic view of the circuit of FIG. 3 and showing the condition of the circuit after initiation of a cycle of operation by an opeator.
Figure 6:
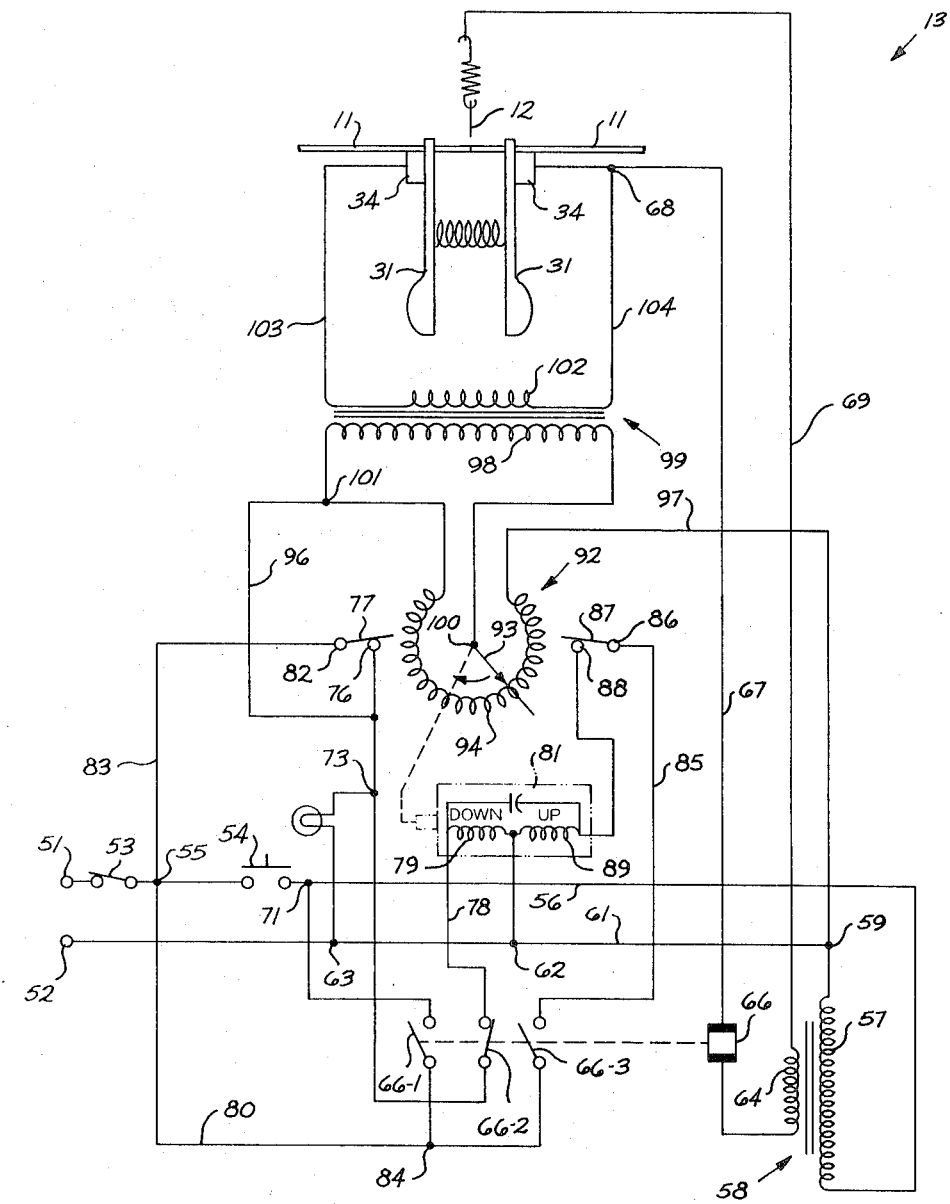
FIG. 6 is a schematic view of the circuit of FIG. 3 and showing the condition of the circuit after the melting of a portion of the disc held between the aligned conductors.

The energization of the relay 66 also opens the normally closed contact 66—2 to open the circuit through the "down" coil 79 of the motor 81 and closes the normally open contact 66—3. The closing of the contact 66—3 completes a circuit from the junction point 62 through the "up" coil 89 of the motor 81, along the line 91, through the high-limit switch 87, back along the line 85, through the now closed contact 66—3 and along the line 80 to the junction point 55. This causes the motor 81 to turn and drive the arm 93 of the autotransformer 92 in a counterclockwise direction, as shown in FIG. 5, in a so-called "up" direction. As the autotransformer arm 93 is turned, the arm disengages and closes the normally closed low-limit switch 77. the condition of the electrical control system 13 just after initiation of a cycle of operation is shown in FIG. 5.

The closing of the low-limit switch 77 completes a circuit from the junction point 55 along the line 83 through the limit switch, along the line 72 to the junction point 74 and then along the line 96 to the junction point 101 and then to the primary coil 98 of the brazing transformer 99 and back into the center point 100 of the autotransformer 92. Also, the autotransformer is energized by completing a circuit from point 101, through the autotransformer winding 94 and back to points 59 and 52. The continued driving of the autotransformer arm 93 in a counterclockwise direction increases the current through the primary coil 98 of the brazing transformer 99 and hence through the secondary coil 102 thereof. Since the secondary coil 102 of the brazing transformer 99 is connected through the lines 103 and 104 across the support blocks 34—34, the increase in current increases the current through the support blocks and hence through the conductors 11-11.

The increase in current through the conductors 11—11 increases the temperature in the joint therebetween which includes a portion of the radial surface areas of the disc 12 of the brazing alloy material. When the temperature reaches a sufficient value, the portion of the disc 12 melts. Contiguous portions of the disc 12 remain in a solid state since the temperature of the remainder of the disc is not yet to the melting point of the material of which the disc is composed.

The counterweight 44 is then rendered effective to move pivotally the support bracket 37 in a clockwise direction to urge the yet solid portion of the disc 12 out of engagement with the melted portion thereof. As can best be seen in FIG. 6, the disengagement of the disc 12 with the joint between the conductors 11—11 interrupts the circuit through the secondary coil 64 of the transformer 58 and the relay 66. The relay 66 is de-energized to open now closed contacts 66-1 and 66-3 and to close now open contact 66-2.

The opening of the contact 66-1 breaks the holding circuit for the relay 66 following depression of the pshbutton switch 54 to condition the system 13 for another cycle of operation.

The opening of the contact 66-3 and the closing of the contact 66-2 opens the circuit through the "up"

coil 89 of the motor 81 and completes a circuit through the "down" coil 79 of the motor, respectively. This causes the motor 81 to reverse the direction of rotation of the autotransformer arm to drive the arm in a clockwise direction as viewed in FIG. 6.

The reversal in direction of rotation of the autotransformer arm 93 decreases gradually the amount of current supplied to the brazing transformer 99 and hence decreases gradually the current applied to the joint between the conductors 11—11. This causes the melted brazing alloy to cool and solidify. In this way, the joint is cooled gradually.

As the autotransformer arm 93 is further rotated in a clockwise direction, the arm engages and opens the low-limit switch 77. The opening of the limit switch 77 interrupts the circuit along the line 72 and through the now closed contact 66-2 through the "down" coil of the motor 81 and stops the motor. The opening of the limit switch 77 also opens the circuits containing the autotransformer winding 94 and brazing transformer primary winding 98, both connected to the common line 96. the control system 13 is now as depicted in FIG. 3 and is conditioned for another cycle of operation.

It should be observed that, within the broad wire capacity range of the machine, no additional adjustments are required to compensate for different gauge conductors 11—11, nor for changes in line voltage nor contact resistances between the conductor ends. Once the operator has inserted the disc 12 between the conductors 11—11 and depressed the pushbutton switch 54 to initiate a cycle of operation, the amount of current required to melt the brazing alloy between the conductors is supplied automatically and independently of the above-mentioned factors.

It is also possible to make provision for decreasing abruptly, rather than gradually, the current applied through the joint between the conductors 11—11. This may be accomplished, as best seen in FIG. 3, by running line 96 from the junction point 101 to the junction point 71 instead of to the junction point 74. In this way, as soon as the relay 66 is de-energized and the contact 66—1 opened, the circuit from the junction point 55 along the line 80 to the juntion point 84 to the junction point 71 and along the line 96 to the primary coil 98 is interrupted to abruptly decrease the current applied to the conductors 11—11.

Further, it is also within the scope of this invention to provide methods of and apparatus for holding the current at that value at which the brazing alloy material melts and subsequently reducing the current abruptly or gradually. This may be accomplished by forming a hole in the motor shaft (not shown) which is larger than the diameter of the set screw (not shown) turned through the autotransformer shaft (not shown) to build some "play" into the connection therebetween. This allows the motor 81 to be driven in a reverse or "down" direction for a short time without turning the autotransformer arm 93. This permits holding the current applied to the conductors 11—11 at the value at which the brazing alloy material melts. Subsequently, the current may be decreased gradually by the system 13 shown in FIG. 3 or abruptly by the modification thereto described hereinbefore.

It should also be pointed out that a motor-operated autotransformer is not essential to this invention and that other electronic or electrical systems may be used to incrase and decrease voltage or current and be within the spirit and scope of this invention.

It is to be understood that the above-described embodiments are simply illustrative of the invention and that many other embodiments can be devised without departing from the scope and spirit of the invention.

What is claimed is:

1. A method of joining an end portion of one conductor to an end portion of another conductor, which includes the steps of:

supporting a disc of fusible material;

holding the end portions of the conductors aligned axially and in engagement with each other;

spacing the end portions of the conductors from each other;

moving the disc of fusible material in a first direction and between the end portions of the conductors;

arresting the movement of the disc when at least the required amount of fusible material to form a joint is positioned between the conductors;

subjecting the disc of fusible material to forces to urge the disc in a second direction opposite to the first direction to a position spaced from the end portions of the conductors;

urging the end portions of the conductors axially into compressive engagement with the disc, the compressive frictional forces with the disc being sufficient to overcome the forces urging the disc in the second direction and hold the fusible material therebetween and enable a first electrical circuit through the conductors and the portion of the fusible material held therebetween and to enable a second electrical circuit through the portion of the fusible material in the joint and portions of the disc spaced therefrom;

connecting the first circuit across a source of electrical current;

the first circuit being normally disabled prior to the energization of the second circuit, the first circuit being in a first mode and capable of increasing the amount of current to the joint when the second circuit is energized and being in a second mode capable of reducing the amount of current to the joint when the second circuit is de-energized;

energizing the second circuit to switch the first circuit to the first mode;

controlling the application of current through the first circuit and the conductors and the fusible material therebetween to increase gradually the current to melt the fusible material between the conductors and permit the forces to urge the unmelted portion of the disc in the second direction out of engagement with the melted portion and interrupt the second circuit to de-energize the second circuit and switch the first circuit to the second mode;

further controlling the application of current through the joint to decrease the current supplied thereto to cool the joint and solidify the fusible material; and discontinuing the application of current to the joint while disabling the first circuit and conditioning the first circuit for another cycle of operation.

2. The method of claim 1, wherein the decrease of the application of current through the joint is graudal.

3. The method of claim 1, wherein the decrease of the application of current through the joint is substantially instantaneous.

4. The method of claim 1, wherein the current level required to melt the fusible material is maintained over a predetermined time period prior to the decrease of the current.

5. The method of claim 4, wherein the decrease of the application of current to the fusible material is gradual.

6. The method of claim 4, wherein the decrease of the application of current to the fusible material is substantially instantaneous.

7. A method of joining an end portion of one conductor to an end portion of another conductor, which includes the steps of:
supporting a disc of fusible material:
holding the end portions of the conductors aligned axially and in engagement with each other;
spacing the end portions of the conductors from each other;
moving the disc of fusible material in a first direction and between the end portions of the conductors
arresting the movement of the disc when at least the required amount of fusible material to form a joint is positioned between the conductors;
subjecting the disc of fusible material to forces to urge the disc in a second direction opposite to the first direction to a position spaced from the end portions of the conductors;
urging the end portions of the conductors axially into compressive engagement with the disc, the compressive frictional forces with the disc being sufficient to overcome the forces urging the disc in the second direction and hold the fusible material therebetween and enable portions of an electrical circuit through the conductors and the portion of the fusible material held therebetween and through the portion of the fusible material in the joint and portions of the disc spaced therefrom;
controlling the application of current through the circuit and the conductors and the fusible material therebetween to increase gradually automatically the current to that level required to melt the fusible material between the conductors and permit the forces to urge the unmelted portion of the disc in the second direction out of engagement with the melted portion;
further controlling the application of current through the joint to decrease automatically the current supplied thereto to cool the joint and solidify the fusible material; and
discontinuing the application of current to the joint while disabling the circuit and conditioning the circuit for another cycle of operation.

8. Apparatus for joining a first part to a second part, which comprises:
means for holding and aligning end portions of the first and second parts;
means for positioning a disc of a fusible material interposed between the parts;
means for urging the end portions of the parts into frictional engagement with the section of fusible material interposed between the parts;
a normally de-energized circuit which includes the disc of fusible material for applying electrical current through the parts and the section of the disc held therebetween;
means for energizing the circuit;
means responsive to the energization of the circuit for increasing the current applied through the circuit to the joint to melt the section of the disc interposed therebetween;
means regulating the amount of fusible material to be used in forming a joint between the parts and rendered effective by the melting of the section of fusible material for overcoming the frictional forces between the disc and the parts and separating the unmelted portion of the disc from the melted portion thereof to interrupt the circuit; and
means responsive to the interruption of the circuit for decreasing the current through the joint to cool the joint and solidify the fusible material.

9. The apparatus of claim 8, wherein the decreasing means decreases gradually the current after the fusible material has melted.

10. The apparatus of claim 8, wherein the decreasing means decreases substantially instantaneously the current applied to the fusible material after the fusible material has melted.

11. The apparatus of claim 8, which also includes means rendered effective prior to the decrease of the current for maintaining the current level required to melt the fusible material over a predetermined time.

12. The apparatus of claim 11, wherein the controlling means decreases gradually the current after the predetermined time.

13. The apparatus of claim 11, wherein the controlling means decreases substantially instantaneously the current applied to the fusible material after the predetermined time.

14. An apparatus for joining an end section of a first conductor to an end section of a second conductor, which comprises:
mean for supporting the first and second conductors in alignment with each other;
means for holding a fusible material between the conductors;
means for biasing the means for holding the fusible material to a position spaced from the conductors;
means for exerting compressive forces axially between the conductors to engage and clamp the fusible material therebetween to establish frictional forces which overcome the baising means to prevent the fusible material from being moved out of engagement with the conductors;
a source of electrical current;
circuit means for applying electrical current from the source to the conductors and the fusible material held therebetween;
normally unoperated means for initiating the operation of the current applying means;
means for operating the normally unoperated means to initiate the current applying means;
means responsive to the operation of the initiating means and to the level of current required to melt the fusible material notwithstanding different levels required because of different conductor gauges and different contact resistances as between successive first and second conductors which are to be joined for causing the current applying means to increase the current to the fusible material continuously to melt that portion of the fusible material in engagement with the conductors whereupon the biasing means is rendered effective and urged to the position spaced from the conductors to separate the unmelted fusible material from the melted fusible material;

means responsive to the separation of the unmelted fusible material from the melted fusible material for causing the initiating means to be returned to the normally unoperated condition; and means responsive to the return of the initiating means to the normally unoperated condition for controlling the application of current to the fusible material to decrease the current to cool the joint and solidify the fusible material.

15. An apparatus for forming a brazed joint between an end section of a first conductor and an end section of a second conductor, which includes:

means for holding and aligning the end sections of the conductors;

means for positioning a disc of a brazing alloy material interposed between the conductors;

means for biasing the positioning means to a position spaced from the conductors;

means for regulating the amount of the successive portions of the disc to be used in forming the joint to at least that amount required for the conductors;

means for generating compressive forces axially between the conductors to engage and clamp the successive portions of the disc therebetween to establish frictional forces which overcome the biasing means and prevent the disc from being moved out of engagement with the conductors;

a source of electrical current;

a normally de-energized circuit which includes the end sections of the conductors and the successive portions of the disc and the holding means for applying electrical current from the source to the conductors and the successive portions of the disc to melt the successive portions of the disc, and which includes;

normally unoperated means having a first mode of operation for increasing the current applied to the conductors and successive portions of the disc and having a second mode of operation for decreasing the current applied to the conductors and the successive portions of the disc;

a first switch normally closed and held open by the normally unoperated means and closed when the normally unoperated means is caused to assume the first mode of operation for connecting the source of current to the conductors; and a second switch operated upon energization of the circuit for causing the normally unoperated means to assume the first mode and returned to an unoperated condition upon separation of the unmelted portion of the disc from successive melted portions thereof, the return of the second switch to an unoperated conditon causing the normally unoperated means to assume the second mode of operation; and means rendered effective by the melting of each successive portion of the disc for separating the unmelted portion of the disc from the melted portion thereof to cause the second switch to return to an unoperated condition;

the return of the second switch to an unoperated condition causing the normally unoperated means to assume the second mode of operation to decrease the current through the joint to cool the joint and solidify the brazing alloy material;

the decrease in the electrical current to a predetermined valve being effective to open the normally closed, now open, first switch to disconnect the source of current from the conductors and conditon the apparatus for another cycle of operation.

* * * * *